United States Patent [19]

Horn et al.

[11] 4,022,752

[45] May 10, 1977

[54] TOUGH POLYBUTYLENE TEREPHTHALATE MOLDING COMPOSITIONS SHOWING GOOD THERMO-AGING STABILITY AND PROCESSING STABILITY

[75] Inventors: Peter Horn, Ludwigshafen; Rolf Wurmb, Heidelberg; Dietrich Wolff, Schwetzingen; Wolfgang Seydl, Frankenthal, all of Germany

[73] Assignee: BASF Aktiengesellschaft, Ludwigshafen, Germany

[22] Filed: Apr. 14, 1975

[21] Appl. No.: 568,145

[30] Foreign Application Priority Data

Apr. 25, 1974 Germany .......................... 2419968

[52] U.S. Cl. .................... 260/45.75 B; 260/45.7 P;
260/45.9 D; 260/45.9 KB; 260/45.95 R;
260/75 NT; 260/75 TN
[51] Int. Cl.² .......................................... C08K 5/16

[58] Field of Search ............. 260/45.9 DI, 45.9 KB,
260/75 NT, 75 TN, 77.5 TB, 45.75 B, 45.7 P

[56] References Cited

UNITED STATES PATENTS

| 2,982,754 | 5/1961 | Sheffer et al. ............... 260/77.5 TB |
| 3,403,128 | 9/1968 | Berndt et al. ...................... 260/45.9 |
| 3,580,886 | 5/1971 | Stewart .......................... 260/45.9 R |

*Primary Examiner*—V. P. Hoke
*Attorney, Agent, or Firm*—Keil, Thompson & Shurtleff

[57] ABSTRACT

Thermoplastic molding compositions based on polybutylene terephthalate having a relative viscosity of from 1.3 to 2.0, as measured in a phenol/o-dichlorobenzene mixture at 25° C, and which contain, to increase the thermo-aging stability and toughness and also to improve the processing stability, from 0.1 to 10% by weight, based on the polybutylene terephthalate, of isocyanates or isothiocyanates and/or carbodiimides and/or compounds forming isocyanate groups or isothiocyanate groups and/or carbodiimide groups.

5 Claims, No Drawings

TOUGH POLYBUTYLENE TEREPHTHALATE MOLDING COMPOSITIONS SHOWING GOOD THERMO-AGING STABILITY AND PROCESSING STABILITY

This invention relates to thermoplastic molding compositions based on polybutylene terephthalate and having improved properties, in particular improved toughness, thermo-aging stability and processing stability.

Thermoplastic polyesters based on polybutylene terephthalate are being increasingly used as starting materials for the manufacture of shaped articles. Polybutylene terephthalate, when used as a molding composition, has important advantages over other thermoplastic polyesters such as polyethylene terephthalate. In particular, polybutylene terephthalate is much simpler to injection-mold than polyethylene terephthalate, since polybutylene terephthalate may be converted to highly crystalline and thus dimensionally stable shaped articles in short cycle times at mold temperatures as low as about 30° to 60° C. On account of the high rate of crystallization even at low temperatures, no difficulties occur when removing the articles from the molds. Furthermore, the dimensional stability of polybutylene terephalate injection moldings is very good even at temperatures at or well above the glass temperatures of polybutylene terephthalate.

However, shaped articles made from polybutylene terephthalate have mechanical properties which are not always satisfactory. In particular, the toughness values of shaped articles are too low compared, for example, with conditioned polyamide molding compositions, and for this reason this easily processable polyester must be excluded from some important industrial applications.

It is also known to incorporate glass fibers in polybutylene terephthalate, by which means, in particular, the rigidity, strength and thermal stress properties are improved.

However, polybutylene terephthalate suffers from the disadvantage that when glass fibers and other fillers are incorporated therein and also when it is used for injection molding, there is a sharp decline in the molecular weight. This decline is more pronounced the higher the processing temperature. However, it is desirable to use processing temperatures as high as possible in order to achieve economically attractive processing rates, but this increases the decline in molecular weight as manifested by sharp deterioration of the mechanical data, particularly the toughness data.

Furthermore, unmodified polybutylene terephthalate molding compositions show inadequate thermo-aging stability.

It is an object of the invention to improve polybutylene terephthalate to such an extent that the above drawbacks of inadequate thermo-aging stability and toughness and poor processing stability during thermoplastic processing no longer occur. According to the invention, this object is achieved by polybutylene terephthalate injection molding compositions having a relative viscosity of from 1.3 to 2.0, as measured in a 3:2 w/w phenol/o-dichlorobenzene mixture at 25° C, and containing from 0.01 to 10% by weight and preferably from 0.1 to 5% by weight of isocyanates or isothiocyanates and/or carbodiimides and/or compounds forming isocyanate groups or isothiocyanate groups and/or carbodiimide groups.

The polybutylene terephthalate injection molding compositions may, if desired, be modified with up to 30 parts of other thermoplastics such as polyamides and/or polycarbonates and/or polyolefins and/or polytetrafluoro ethylene and/or polyformaldehyde and/or polyphenylene oxide and/or copolymers of ethylene/acrylic acid and/or ethylene/methyl acrylate and thermoplastic polyurethanes.

By isocyanates we mean monoisocyanates, monoisothiocyanates, diisocyanates, diisothiocyanates, polyisocyanates and polyisothiocyanates.

Basically, all known isocyanates of the above types are suitable for the manufacture of the polybutylene terephthalate molding compositions of the invention. However, it is particularly advantageous to use isocyanates or isothiocyanates having at least 2 NCO or 2 NCS groups in the molecule of the general formula:

OCN—R—NCO and SCN—R—NCS, in which R denotes an aliphatic, alicyclic and/or aromatic radical or a substituted derivative thereof, provided that the substituent is not reactive with an isocyanate group or isothiocyanate group. Suitable substituents are groups such as sulfoxy, sulfonyl, alkoxy, aryloxy, oxo and ester groups. Each diisocyanate is characterized by a specific hydrocarbon radical.

As examples of diisocyanates having aliphatic hydrocarbon radicals mention may be made of tetramethylene diisocyanate, hexamethylene diisocyanate, dodecamethylene diisocyanate and 2,2,4-trimethylhexamethylene diisocyanate. Examples of diisocyanates having alicyclic hydrocarbon radicals are cyclohexane-1,3-diisocyanate, cyclohexane-1,4-diisocyanate, isophorone diisocyanate, bis-(3-methyl-4-isocyanatocyclohexyl)-methane, bis-(4-isocyanato-cyclohexyl)-methane and 2,2-bis(4-isocyanatocyclohexyl)-propane. Examples of diisocyanates having aromatic hydrocarbon radicals are m- and p-phenylene diisocyanates, biphenyl diisocyanates and naphthylene diisocyanates. As examples of diisocyanates having more than one type of hydrocarbon radical mention may be made of toluylene-2,4-diisocyanate, toluylene-2,6-diisocyanate, durol diisocyanate, 4,4'-diphenylmethane diisocyanate, 3,3'-dimethyl-4,4'-biphenylene diisocyanate, 4,4'-diphenylisopropylidene diisocyanate, p-xylylene diisocyanate, m-xylylene diisocyanate, 4-(4-isocyanato-cyclohexyl)-phenylisocyanate and 4-isocyanatobenzylisocyanate. In the above examples the isocyanate groups are partly combined with the same organic radicals and partly with different organic radicals. Use may also be made of diisocyanates having functionally substituted organic radicals, for example 4,4'-diphenylsulfone diisocyanate, 4,4'-diphenylether diisocyanate, 3,3'-dimethoxy-4,4'-biphenylene diisocyanate, di-(3-isocyanatopropyl)-ether and ester cyanates such as lysine ester diisocyanates, triisocyanato-arylphosphorus esters, triisocyanato-arylphosphorus thioesters and glycoldi-p-isocyanatophenyl ester. Other specific diisocyanates which are useful for the purposes of the invention are disclosed in the literature, see for example "Mono- and Polyisocyanate," W. Siefken, Annalen der Chemie, 562, pp. 6 to 136 (1949). Other suitable compounds are partially polymerized isocyanates having isocyanurate rings and free NCO groups and also polyisocyanates or isocyanate-donating compounds containing urethane, allophanate, amide and urea groups. In place of the above isocyanates it is possible to use the corresponding isothiocyanates.

Masked isocyanates or isocyanate-donating compounds are particularly suitable for the manufacture of the tough polybutylene terephthalate injection molding compositions of the invention showing good thermoaging stability and processing stability. Masked isocyanates are, for example, dimeric isocyanates and isocyanatedonating compounds are for example adducts of isocyanates with OH—, NH—, CH—, or SH-acidic compounds such as adducts of toluylene-(2,4)-diisocyanate with phenol or o-chlorophenol or with cyclic lactams such as pyrrolidone, caprolactam, capryllactam or lauroyllactam.

The dimeric isocyanates suitable for the purposes of the invention and their manufacture are described in German Published Application 1,445,721. Particularly suitable are the dimers of phenylisocyanate, toluylene-2,4-diisocyanate and diphenylmethane-4,4'-diisocyanate.

Particularly suitable for the manufacture of the tough polybutylene terephthalate injection molding compositions of the invention are monocarbodiimides of the general formula:

R—N=C=N—R', in which R and R' denote alkyl, cycloalkyl and/or aryl groups which may or may not be substituted. Any substituents present are preferably alkyl, aryl, alkoxy or halo. The aryl group may, if desired, be substituted by isocyanate groups. Examples of suitable monocarbodiimides are diisopropylcarbodiimide, dicyclohexylcarbodiimide, methyl-t-butylcarbodiimide, t-butylphenylcarbodiimide and di-(2,6-di-t-butylphenyl)-carbodiimide. Also suitable are bis-carbodiimides such as are available by the process described in German Pat. No. 924,751, e.g. tetramethylene-ω,ω'-bis-t-butylcarbodiimide:

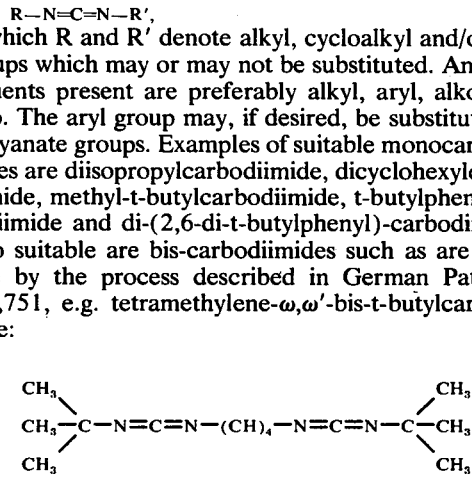

Other carbodiimides which may be used for the present invention are those additionally containing functional groups, for example tertiary amino groups or hydroxyl groups. As example of such carbodiimides there may be mentioned N-dimethylaminopropyl-t-butylcarbodiimide and the monoglycol ether of oxyphenyl-t-butylcarbodiimide:

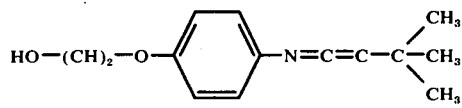

It is advantageous to select carbodiimides which have as low a vapor pressure as possible and which, on account of their low volatility, cannot diffuse out of the finished plastic material.

In addition to monocarbodiimides and biscarbodiimides, which may or may not contain free isocyanate groups, polycarbodiimides having a molecular weight of more than 500 and a content of more than three carbodiimide groups are also particularly suitable for the manufacture of tough polybutylene terephthalate injection molding compositions of the invention showing good thermo-aging and processing stabilities. Such polycarbodiimides are highly viscous to resinous substances and are sparingly soluble to insoluble in organic solvents depending on their molecular weight. If they have been prepared from isocyanates, they may contain reactive NCO groups and co-ordinated monomeric isocyanates. Suitable polycarbodiimides are for example those which may be obtained from polyisocyanates using catalytic amounts of phospholines, phospholidines and their oxides and sulfides according to French Pat. No. 1,180,307. Other suitable polycarbodiimides may be prepared from aromatic diisocyanates and polyisocyanates bearing one or two aryl, alkyl, aralkyl or alkoxy substituents in the o-position to all NCO groups, at least one of the substituents having at least two carbon atoms, under the action of tertiary amines, alkaline-reacting metal compounds, carboxylic metal salts and non-basic metal organic compounds. NCO group-containing polycarbodiimides may be modified by eliminating the isocyanate groups present with reactive hydrogen-containing compounds such as alcohols, phenols or amines.

A preferred embodiment of the process for the manufacture of the tough polybutylene terephthalate molding compositions of the invention showing good thermo-aging and processing stabilities consists in the incorporation of the isocyanates and/or carbodiimides and/or compounds forming isocyanate or carbodiimide groups into the molten polybutylene terephthalate by means of an extruder.

The polybutylene terephthalate molding compositions of the invention are distinguished, in particular, by a much higher degree of toughness than unmodified polybutylene terephthalate molding compositions. At the same time, these molding compositions show high strength and rigidity values and may be readily injection-molded in short cycle times. Furthermore, the molding compositions of the invention possess very good processing stability making it possible to process the compositions at higher melt temperatures without the molecular weight suffering reduction on account of thermal degradation. In addition, the polybutylene terephthalate molding compositions of the invention are characterized by greatly improved thermo-aging stability over unmodified polybutylene terephthalate compositions, as a result of which the maximum temperature for uninterrupted use is from about 10° to 20° C higher to give absolute values of from 120° to 130° C.

Polybutylene terephthalate, a polyester of terephthalic acid and butanediol-1,4, is well known. It is preferably prepared by transesterification of a dialkyl or diaryl ester of terephthalic acid (particularly dimethyl terephthalate) with butanediol-1,4 followed by condensation in the presence of suitable catalysts. Polybutylene terephthalate has a melting point of about 222° C. This polyester is preferably injection-molded at plastics temperatures of from 230° to 275° C.

The polybutylene terephthalate used in the manufacture of the molding compositions of the invention usually has a relative viscosity of from 1.3 to 1.8 and preferably from 1.5 to 1.7, as measured on a 0.5% solution in a 3:2 mixture of phenol and o-dichlorobenzene at 25° C.

The thermoplastic molding compositions contain polybutylene terephthalate which may be modified with other dicarboxylic acids or alcohols to an extent of up to 20% molar. Suitable modifying agents are, for example, aliphatic, cycloaliphatic or aromatic dicarboxylic acids, such as adipic acid, azelaic acid, sebacic acid, dodecane dioic acid, cyclohexane dioic acid, isophthalic acid and naphthalene dioic acid. Examples of alcoholic modifying agents are, in particular, aliphatic and cycloaliphatic glycols of from 2 to 10 carbon atoms, for example ethylene glycol, propylene glycol, hexamethylene glycol, neopentyl glycol and diethylene glycol.

Suitable reinforcing fillers are those capable of increasing the rigidity of the polyesters. We prefer to use fibrous materials, in particular glass fibers of low-alkali E glass. The l/d ratio should not be greater than 30:1. Alternatively, non-fibrous fillers may be used, such as natural kaolins and calcinated kaolins. Suitable glass fibers have diameters of from 5 to 20 $\mu$m and preferably from 8 to 15 $\mu$m and may be used as rovings or chopped strands. They are treated with suitable adhesion promoters based on silanes and suitable sizing systems, for example those based on polyesters or polyepoxides.

The other suitable fillers are also advantageously treated with adhesion promoters.

The length of the glass fibers in the molding compositions is from 0.05 to 1 $\mu$m and preferably from 0.10 to 0.40 $\mu$m.

Incorporation of the glass fibers is carried out, for example, in suitable extruders such as is described in U.S. Pat. No. 3,304,282.

The polybutylene terephthalate molding compositions of the invention may also contain flame retardants based on elementary red phosphorus, phosphorus compounds, halogen compounds, antimony compounds and nitrogen compounds and also dyes and pigments, stabilizers counteracting thermal, thermooxidative and ultraviolet degradation, waxes, lubricants and processing auxiliaries ensuring trouble-free extrusion and injection molding and antistatic agents.

EXAMPLE 1

Polybutylene terephthalate having a relative viscosity of 1.66 is melted in a twin-shaft extruder at various temperatures. Oligomeric Carbodiimides in the amounts given in Table 1 below were previously tumbled onto the polyester granules. At a downstream point of the extruder there is a port through which 6 mm long chopped glass strands or fillers may be fed to the composition. The polymer melt is extruded through dies and the rope extrudate is granulated.

EXAMPLE 2

Polybutylene terephthalate having a relative viscosity of 1.655 is mixed with glass fibers and the additives in an extruder in the manner described in Example 1. The granules containing glass fibers are converted, at various plastics temperatures, to standard small rods for determination of the impact resistance according to DIN 53,453. The results are listed in Table 2 below.

Blending of polybutylene terephthalate with glass fibers in the presence of polycarbodiimides containing isocyanate end groups.

| Polycarbo-diimide (%) | Glass fibers (%) | Filler (%) | Plastics temperature in extruder (° C) | Relative viscosity |
|---|---|---|---|---|
| — | — | — | 260 | 1.58 |
| 0.2 A | — | — | 260 | 1.66 |
| — | 30 | — | 240 | 1.565 |
| — | 30 | — | 260 | 1.43 |
| 0.5 A | 30 | — | 240 | 1.66 |

-continued

Blending of polybutylene terephthalate with glass fibers in the presence of polycarbodiimides containing isocyanate end groups.

| Polycarbo-diimide (%) | Glass fibers (%) | Filler (%) | Plastics temperature in extruder (° C) | Relative viscosity |
|---|---|---|---|---|
| 1.0 A | 30 | — | 260 | 1.755 |
| — | — | 40 | 260 | 1.51 |
| 1.0 A | — | 40 | 260 | 1.701 |

Polycarbodiimide A: prepared from toluylene diisocyanate.

TABLE 2

Toughness of glass fiber reinforced polybutylene terephthalate blended with oligomeric isocyanates having a carbodiimide, isocyanurate or $$-\underset{\underset{O}{\overset{\|}{C}-N-}}{\overset{\overset{O}{\|}}{N-C}}$$

structure as a function of the processing conditions.

| Isocyanate (%) | Glass fiber content (%) | Impact resistance (cmkpcm$^{-2}$) 250° C | 270° C | 290° C | according to DIN 290° C |
|---|---|---|---|---|---|
| — | 30 | 42.2 | 43.3 | 35.2 | 20.2 |
| 0.5 A | 30 | 44.5 | 44.1 | 46.0 | 46.6 |
| 0.5 B | 30 | 46.4 | 46.4 | 44.7 | 44.7 |
| 0.2 B | 30 | 45.2 | 44.8 | 45.3 | 45.0 |
| 0.5 C | 30 | 43.2 | 42.4 | 44.0 | 43.8 |

A: as in Table 1
B: tetrameric toluylene diisocyanate of isocyanurate structure
C: prepared from toluylene diisocyanate and having isocyanate end groups

COMPARATIVE TEST A

Polybutylene terephthalate having a relative viscosity of 1.655 was injection-molded to standard test specimens at a plastics temperature of 255° C and a mold temperature of 60° C, which specimens were tested for their mechanical properties according to DIN standards. The results are listed in Table 4 below.

EXAMPLES 3 to 7

The additives listed in Table 3 are incorporated in polybutylene terephthalate having a relative viscosity of 1.655 (corresponding to the material used in Comparative Test A) in an extruder at a plastics temperature of from 255° C to 260° C.

TABLE 3

| Example | Additive | Relative viscosity of extruded granules |
|---|---|---|
| 3 | 1 part of polycarbodiimide D | 1.655 |
| 4 | 1 part of dicyclohexylcarbodiimide | 1.63 |
| 5 | 1 part of polycarbodiimide A | 1.77 |
| 6 | 2 parts of polycarbodiimide D | 1.72 |
| 7 | 4 parts of 4,4'-diphenylmethane diisocyanate | 1.774 |

Polycarbodiimide D: aromatic polycarbodiimide of the formula $$\left[\begin{array}{c} R \\ \phantom{xxx} \\ R \end{array} \underset{R}{\underbrace{\phantom{xxxxx}}} N=C=N \right]_n$$

STABAXOL PCD by Bayer

The extruded granules were then dried thoroughly and converted to standard specimens under the conditions mentioned in Comparative Test A. The results of the tests on the mechanical properties are listed in Table 4 below.

diphenylmethane diisocyanate and subjected to the heat-storage test.

TABLE 4

| Comparative Test and Examples Compositions as given in Table 3 | | | A | 3 | 4 | 5 | 6 | 7 |
|---|---|---|---|---|---|---|---|---|
| Yield stress | kg/cm² | DIN 53,455 | 580 | 567 | 569 | 595 | 570 | 602 |
| Tensile strength at break | kg/cm² | DIN 53,455 | 370 | 382 | 342 | 386 | 340 | 371 |
| Elongation at break | % | DIN 53,455 | 15 | 110 | 79 | 53 | 80 | 30 |
| Modulus of elasticity (under tension) | kg/cm² | DIN 53,457 | 26000 | 25000 | 25300 | 24000 | 26000 | 27000 |
| Impact resistance | cmkg/cm² | DIN 53,453 | no fracture | no fracture | no fracture | no fracture | no fracture | no fracture |
| Notched impact resistance | cmkg/cm² | DIN 53,453 | 3 | 3 | 2.3 | 2.6 | 3.1 | 2.7 |
| Perforated impact resistance+ | cmkg/cm² | DIN 53,453 | 30 | 48 | 45 | 63 | 66 | 74.2 |

+diameter of bore 3 mm

COMPARATIVE TEST B

In order to determine the thermo-aging stability of polybutylene terephthalate, specimens were stored at 160° C in an air circulating drying cabinet. These specimens measured 127 × 12.7 × 1.6 mm and were processed by injection molding of polybutylene terephthalate (relative viscosity 1.655) at a plastics temperature of 255° C and a mold temperature of 60° C. The reduction in relative viscosity and of toughness and the increase in the content of carboxyl end groups during storage at 160° C were observed.

The toughness was determined on sets of ten specimens. The ends of each specimen were bent together and the number of specimens which broke under this treatment was counted.

| Duration of storage at 160° C (days) | Number of broken specimens | Relative viscosity | Carboxyl end group content (mg-equivalents/kg) |
|---|---|---|---|
| 0 | 0 | 1.645 | 67 |
| 2 | 4 | — | — |
| 5 | 10 | — | — |
| 7 | 10 | — | — |
| 9 | 10 | 1.465 | 117 |
| 12 | 10 | — | — |
| 15 | 10 | 1.44 | 170 |

EXAMPLE 8

0.5 part of dimeric phenyl isocyanate was incorporated in polybutylene terephthalate using an extruder under the conditions mentioned in Comparative Test B to form specimens measuring 127 × 12.7 × 1.6 mm. The results of storage in an air circulating drying cabinet at 160° C are listed in the Table below.

| Duration of storage at 160° C (days) | Number of broken specimens | Relative viscosity | Carboxyl end group content (mg-equivalents/kq) |
|---|---|---|---|
| 0 | 0 | 1.61 | 48 |
| 5 | 0 | — | — |
| 11 | 0 | — | — |
| 15 | 0 | 1.55 | 59 |
| 20 | 0 | — | — |
| 29 | 7 | 1.52 | 74 |
| 40 | 10 | 1.505 | 83 |

EXAMPLE 9

In a manner similar to that described in Example 8, test specimens were made from polybutylene terephthalate treated with 0.5 part of dimeric 4,4'-

| Duration of storage at 160° C (days) | Number of broken specimens | Relative viscosity | Carboxyl end group content (mg-equivalents/kq) |
|---|---|---|---|
| 0 | 0 | 1.62 | 63 |
| 5 | 0 | — | — |
| 11 | 0 | — | — |
| 15 | 1 | 1.595 | 74 |
| 20 | 4 | — | — |
| 29 | 8 | 1.555 | 29 |
| 40 | 10 | 1.515 | 92 |

EXAMPLE 10

Test specimens measuring 127 × 12.7 × 1.6 mm of polybutylene terephthalate into which 1 part of polycarbodiimide D (see Example 3) had been incorporated in an extruder, were subjected to the heat-storage test at 160° C in an air circulating drying cabinet.

| Duration of storage at 160° C (days) | Number of broken specimen | Relative viscosity | Carboxyl end group content (mg-equivalents/kg) |
|---|---|---|---|
| 0 | 0 | 1.65 | 34 |
| 5 | 0 | — | — |
| 11 | 0 | — | — |
| 15 | 0 | 1.63 | 45 |
| 20 | 1 | — | — |
| 29 | 6 | 1.605 | 57 |
| 39 | 10 | 1.595 | 68 |

COMPARATIVE TEST C

To test the processing stability, polybutylene terephthalate was injection-molded to standard small rods at increasing plastics temperatures (mold temperature remaining constant at 60° C), which specimens were then tested according to DIN standards for impact resistance, notched impact resistance, perforated impact resistance (diameter of perforation 3 mm) and relative viscosity.

| Plastics temperature (° C) | Impact resistance | Notched impact resistance (cmkg/cm²) | Perforated impact resistance | Relative viscosity |
|---|---|---|---|---|
| 260 | no fracture | 2.6 | 33 | 1.603 |
| 270 | no fracture | 2.6 | 32 | 1.572 |
| 280 | no fracture | 2.2 | 26 | 1.56 |
| 290 | 22 | 2.1 | 18 | 1.47 |
| 300 | 14 | 1.4 | 10 | 1.462 |

EXAMPLES 11 and 12

In a manner similar to that described in Comparative Test C aging tests and measurements were made on polybutylene terephthalate into which 2 parts of polycarbodiimide D (see Example 3) or 4 parts of 4,4'-diphenylmethane diisocyanate had been incorporated in an extruder. The results of the measurements are listed in the Table 5 below.

TABLE 5

| Plastics temperature (° C) | Example 11: Polybutylene terephthalate containing 2 parts of polycarbodiimide D | | | | Example 12: Polybutylene terephthalate containing 4 parts of 4,4'-diphenylmethane diisocyanate | | | |
|---|---|---|---|---|---|---|---|---|
| | impact resistance | notched impact resistance (cmkg/cm²) | perforated impact resistance | relative viscosity | impact resistance | notched impact resistance (cmkg/cm²) | perforated impact resistance | relative viscosity |
| 260 | no fracture | 2.4 | 69 | 1.758 | no fracture | 2.9 | 81 | — |
| 270 | '' | 2.6 | 59 | 1.73 | '' | 3.0 | 69 | — |
| 280 | '' | 2.2 | 42 | 1.675 | '' | 2.4 | 55 | — |
| 290 | 30 | 1.7 | 22 | 1.535 | 43 | 1.7 | 24 | 1.60 |
| 300 | 15 | 1.5 | 14 | 1.475 | 35 | 1.4 | 12 | 1.51 |

Perforated impact resistance measured with perforations of 3 mm in diameter

We claim:

1. Tough polybutylene terephthalate molding compositions showing good thermo-aging and processing stabilities and having a relative viscosity of from 1.3 to 2.0, as measured in a mixture of phenol/o-dichlorobenzene at 25° C, said compositions comprising: polybutylene terephthalate and from 0.01 to 10% by weight, based on the polybutylene terephthalate, of adducts of isocyanates with OH—, NH—, CH—, or SH— acidic compounds.

2. Polybutylene terephthalate molding compositions as claimed in claim 1, wherein the isocyanate-forming compound is the adduct of toluylene-2,4-diisocyanate with phenol or o-chloro phenyl.

3. Tough polybutylene terephthalate molding compositions showing good thermo-aging and processing stabilities as claimed in claim 1, wherein the isocyanate-forming compound is the adduct of 1,6-hexamethylene diisocyanate with ε-caprolactam.

4. Polybutylene terephthalate molding compositions as claimed in claim 1 and containing from 3 to 15% by weight, based on the weight of polymers, of an organic halogen, phosphorus or nitrogen compound which is stable under the melt-processing conditions, either alone or in combination with from 2 to 10% by weight, based on the weight of polymers, of a synergistic metal compound, preferably antimony trioxide, and/or 2 to 12% by weight, based on the weight of polymers, of elementary red phosphorus.

5. Polybutylene terephthalate molding compositions as claimed in claim 1 and containing from 0.01 to 5% by weight, based on the polymer matrix, of phenolic antioxidants or amine antioxidants.

* * * * *

UNITED STATES PATENT AND TRADEMARK OFFICE
CERTIFICATE OF CORRECTION

PATENT NO. : 4,022,752
DATED : May 10, 1977
INVENTOR(S) : Peter Horn et al

It is certified that error appears in the above—identified patent and that said Letters Patent are hereby corrected as shown below:

[56]     References Cited
         UNITED STATES PATENTS
The following patents were also cited:

| Number | Date | Name | Class |
|---|---|---|---|
| 3,751,396 | 8/1973 | Gall | 260/40R |
| 2,606,162 | 8/1952 | Coffey et al | 260/75TN |
| 3,099,642 | 7/1963 | Holtschmidt et al | 260/75NT |
| 3,193,522 | 7/1965 | Neumann et al | 260/459DI |
| 3,193,523 | 7/1965 | Neumann et al | 260/459DI |
| 3,226,368 | 12/1965 | Reischl et al | 260/459DI |
| 3,491,180 | 1/1970 | Thoma et al | 260/75TN |
| 3,640,966 | 2/1972 | Hennig et al | 260/75NT |
| 3,624,024 | 11/1971 | Caldwell et al | 260/4575B |
| 3,808,127 | 4/1974 | Sander et al | 260/45TP |
| 3,563,849 | 2/1971 | Rye et al | 260/75TN |

Signed and Sealed this

Eleventh Day of April 1978

[SEAL]

Attest:

RUTH C. MASON
Attesting Officer

LUTRELLE F. PARKER
Acting Commissioner of Patents and Trademarks